(12) United States Patent
Li et al.

(10) Patent No.: US 10,074,180 B2
(45) Date of Patent: Sep. 11, 2018

(54) PHOTO-BASED POSITIONING

(71) Applicant: International Business Machines Corporation, Armonk, NY (US)

(72) Inventors: Qi Cheng Li, Beijing (CN); Li Jun Mei, Beijing (CN); Jian Wang, Beijing (CN); Fang Quan Xie, Beijing (CN); Shi Wan Zhao, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/627,435

(22) Filed: Feb. 20, 2015

(65) Prior Publication Data

US 2015/0248762 A1 Sep. 3, 2015

(30) Foreign Application Priority Data

Feb. 28, 2014 (CN) .......................... 2014 1 0073370

(51) Int. Cl.
*G06T 7/00* (2017.01)
*G06K 9/62* (2006.01)
(Continued)

(52) U.S. Cl.
CPC ............. *G06T 7/0042* (2013.01); *G06T 7/73* (2017.01); *G06K 9/4671* (2013.01); *G06K 9/52* (2013.01)

(58) Field of Classification Search
CPC ...... G01C 15/00; G01C 11/00; G01C 21/005; G01C 21/165; G01C 21/206; G01C 11/10;
(Continued)

(56) References Cited

U.S. PATENT DOCUMENTS 6,975,755 B1 * 12/2005 Baumberg ........... G06K 9/4642
345/419
8,463,541 B2 6/2013 Park
(Continued)

FOREIGN PATENT DOCUMENTS

CN        1698067 A    11/2005
CN      101093503 A    12/2007
(Continued)

OTHER PUBLICATIONS

L. Agrawal, et al., "Smart Phone Based Indoor Pedestrian Localization System," IEEE, 13th International Conference on Computational Science and its Applications, Jun. 24-27, 2013, pp. 137-143.
(Continued)

*Primary Examiner* — Kim Vu
*Assistant Examiner* — Michael Vanchy, Jr.
(74) *Attorney, Agent, or Firm* — Cantor Colburn LLP

(57) ABSTRACT

A method photo-based positioning includes obtaining a positioning photo taken by a mobile device within a predetermined space; comparing multiple feature elements exacted from sampling photos taken within the predetermined space in advance with the positioning photo to determine each feature element existing in the positioning photo; obtaining a first position coordinate of each feature element which is determined to exist in the positioning photo in a sampling photo corresponding to the positioning photo, and a second position coordinate of each feature element which is determined to exist in the positioning photo in the positioning photo; and calculating position parameters of the mobile device by using each of the obtained first position coordinate and second position coordinate, wherein the least number of feature elements existing in the positioning photo is determined according to the number of the position parameters.

14 Claims, 9 Drawing Sheets

(51) Int. Cl.
*G06K 9/52* (2006.01)
*G01B 11/00* (2006.01)
*G06T 7/73* (2017.01)
*G06K 9/46* (2006.01)

(58) Field of Classification Search
CPC .............. G01C 15/06; G06T 7/0042; G06T 2207/10032; G06T 7/73; G06T 7/74; G06T 2207/10021; G06T 2207/30252; G06T 7/248; G06T 2207/30242; G06K 9/52; G06K 9/6201; G06K 9/6232; G06K 9/00664; G06K 9/46; G06K 9/4671; G06K 2017/0051; G06K 2209/27; G06K 9/6218; G06K 9/467; G05D 1/0274; G06F 17/30256; G06Q 10/087; G06Q 10/0875; G06Q 20/12; G06Q 20/203; G06Q 30/0639; G06Q 50/28; G08B 13/248; G08B 13/246; G01G 19/4144; G01G 23/3735; G09G 2380/04; H04N 2380/04

See application file for complete search history.

(56) References Cited

U.S. PATENT DOCUMENTS

2007/0263924 A1* 11/2007 Kochi .................. G01B 11/24
                                                            382/154
2011/0164832 A1    7/2011 Yoon et al.
2012/0163656 A1*  6/2012 Wang .................. G01C 15/00
                                                            382/103
2013/0208997 A1*  8/2013 Liu ..................... G06T 3/20
                                                            382/284
2013/0297205 A1* 11/2013 Kim .................... G01C 21/206
                                                            701/523
2013/0303189 A1* 11/2013 Bennett ............... H04W 12/02
                                                            455/456.2

FOREIGN PATENT DOCUMENTS

| CN | 102113006 A | 6/2011 |
| CN | 102667855 A | 9/2012 |
| CN | 103119611 A | 5/2013 |
| CN | 103167395 A | 6/2013 |
| CN | 2004165790 A | 8/2013 |
| CN | 103442436 A | 12/2013 |
| JP | 2004165790 A | 6/2004 |
| JP | 2010515135 A | 5/2010 |
| WO | 2006030444 A2 | 3/2006 |
| WO | 2012096877 A1 | 7/2012 |
| WO | 2013096222 A1 | 6/2013 |

OTHER PUBLICATIONS

H. Kawaji, et al., "Image-based Indoor Positioning System: Fast Image Matching using Omnidirectional Panoramic Images," MPVA'10, ACM, Firenze, Italy, Oct. 29, 2010, pp. 1-4.
R. Mautz, et al., "Survey of Optical Indoor Positioning Systems," International Conference on Indoor Positioning and Indoor Navigation (IPIN), IEEE, Sep. 2011, pp. 1-7.

* cited by examiner

US 10,074,180 B2

PHOTO-BASED POSITIONING

FOREIGN PRIORITY

This application claims priority to Chinese Patent Application No. 201410073370.8, filed Feb. 28, 2014, and all the benefits accruing therefrom under 35 U.S.C. § 119, the contents of which in its entirety are herein incorporated by reference.

BACKGROUND

The present disclosure relates to the technologies of computers, image processing, positioning, navigation and mobile communication, and more specifically, to a method and apparatus for photo-based positioning.

In recent years, location-based services have been developed rapidly. For example, in sites such as a large shopping mall, a library, a tourist spot, a parking lot, a campus, an airport, a hotel, a warehouse, etc., a user needs to determine his/her own precise location to obtain various location-based services such as guide service provided by a service provider.

Currently, the main technology for location-based service is Wi-Fi based positioning technology whose main principle is as follows. A certain number of Wi-Fi access points are pre-arranged within for example a certain site described in the above, and predetermined sampling spots are selected with some distribution degree within the site. Received signal strength (RSS) from each Wi-Fi access point is measured at those sampling spots, and the received signal strength is converted to distance to each Wi-Fi access point, so as to determine the positional coordinates of each sampling spots. The positional coordinates of those sampling spots are stored in a library as base positional data. In practical applications, when a user's Wi-Fi device measures the RSS of signals received from different Wi-Fi access points within the spot, the user's Wi-Fi device sends the measured RSS values to a remote server. The remote server compares the measured RSS values with the base positional data stored in the library to obtain the data on the location of the user's Wi-Fi device, and sends the data of the location to the user's Wi-Fi device.

SUMMARY

According to one aspect of the present disclosure, a photo-based positioning method includes obtaining a positioning photo taken by a mobile device within a predetermined space; comparing multiple feature elements exacted from sampling photos taken within the predetermined space in advance with the positioning photo to determine each feature element existing in the positioning photo; obtaining a first position coordinate of each feature element which is determined to exist in the positioning photo in a sampling photo corresponding to the positioning photo, and a second position coordinate of each feature element which is determined to exist in the positioning photo in the positioning photo; and calculating position parameters of the mobile device by using each of the obtained first position coordinate and second position coordinate, wherein the least number of feature elements existing in the positioning photo is determined according to the number of the position parameters.

According to another aspect of the present disclosure, a photo-based positioning apparatus includes a photo obtaining unit configured to obtain a positioning photo taken by a mobile device within a predetermined space; a feature matching unit configured to compare multiple feature elements exacted from sampling photos taken within the predetermined space in advance with the positioning photo to determine each feature element existing in the positioning photo; a coordinate obtaining unit configured to obtain a first position coordinate of each feature element which is determined to exist in the positioning photo in a sampling photo corresponding to the positioning photo, and a second position coordinate of each feature element which is determined to exist in the positioning photo in the positioning photo; and a position calculating unit configured to calculate position parameters of the mobile device by using each of the obtained first position coordinate and second position coordinate, wherein the least number of feature elements existing in the positioning photo is determined according to the number of the position parameters.

According to yet another aspect of the present disclosure, a computer program product of photo-based positioning includes a storage medium accessible by a computer and storing instructions, the instructions being executed by the computer to perform each operation of the method of photo-based positioning provided by the above respects of the present disclosure.

With the method, apparatus and computer program product of photo-based positioning according to the embodiments of the present disclosure, it is possible to provide more precise position information and also direction information to perform precise navigation, shopping guidance and so on.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

One aspect influencing Wi-Fi based location service is that the indication of RSS is mainly to measure the received signal power level of the mobile device, but the transmission of wireless electric wave may be influenced by various factors such as reflection, absorption by barrier or the like and thus varies dramatically; therefore, the Wi-Fi based location service is not precise.

The method and apparatus for photo-based positioning according to embodiments of the present disclosure take multiple sampling photos at selected sampling spots in a predetermined (in-door) space, and extract feature elements from the sampling photos to pre-build a feature-location library (FLL). When positioning, a mobile device such as a camera, a video camera, a mobile phone, a PDA, a wearable device or the like is used to take a photo for positioning (which is referred to as positioning photo hereafter), and it is identified whether the exacted feature elements exist in the taken positioning photo. If they exist in the taken positioning photo, the location of the mobile device is calculated according to the position of the identified feature elements and their positional relations in the positioning photo.

Some preferable embodiments will be described in more detail with reference to the accompanying drawings, in which the preferable embodiments of the present disclosure have been illustrated. However, the present disclosure may be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

Figure 1:
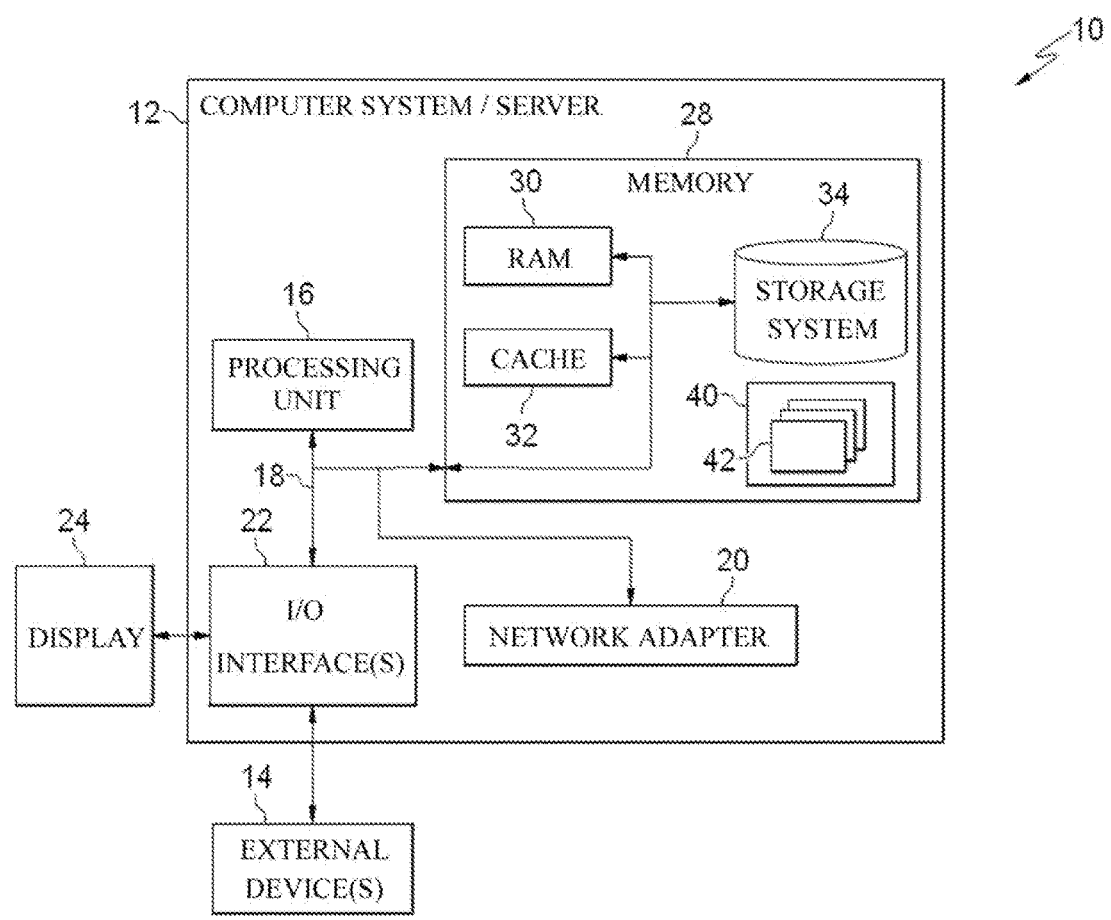
FIG. 1 shows a block diagram of an exemplary computer system/server which is applicable to implement the embodiments of the present disclosure.

Referring now to FIG. 1, in which an exemplary computer system/server 12 which is applicable to implement the embodiments of the present disclosure is shown. Computer system/server 12 is only illustrative and is not intended to suggest any limitation as to the scope of use or functionality of embodiments of the disclosure described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 and processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 may include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 may be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media may be provided. In such instances, each may be coupled to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the disclosure as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication may occur via Input/Output (I/O) interfaces 22. Still yet, computer system/server 12 may communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
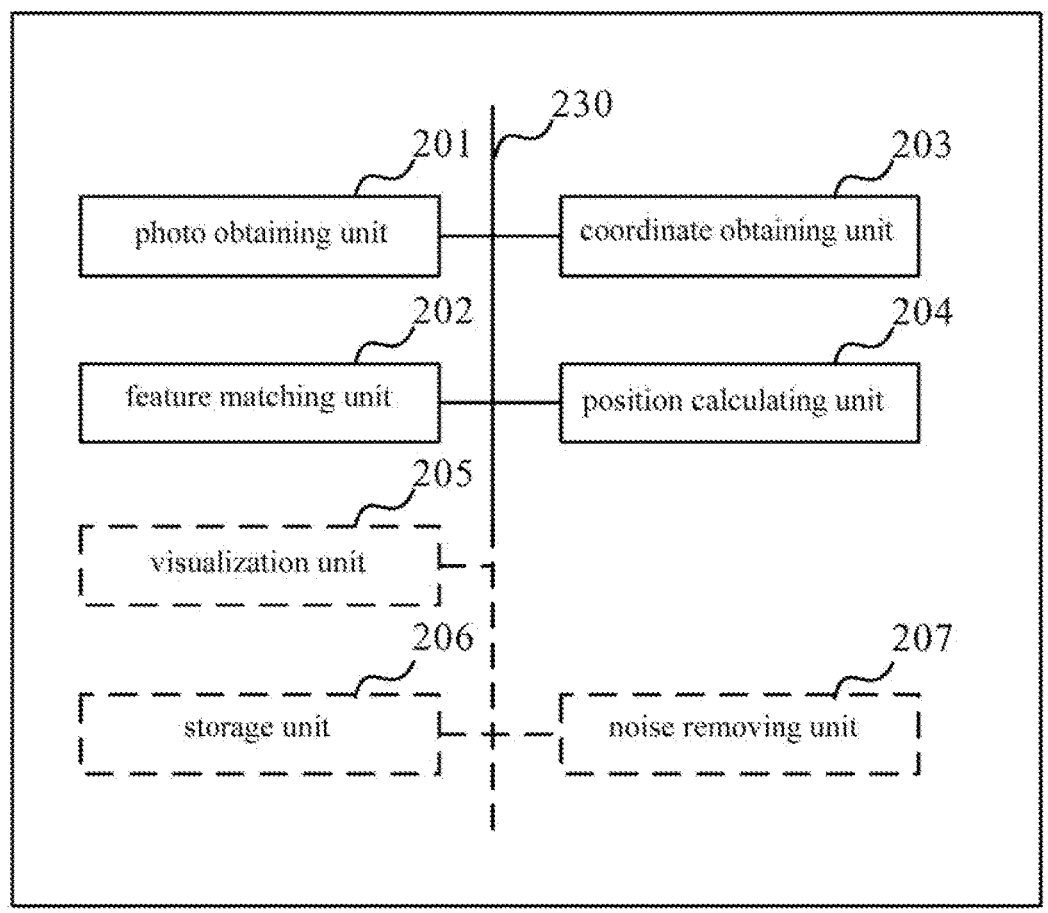
FIG. 2 shows a block diagram of an apparatus for photo-based positioning according to a first embodiment of the present disclosure.

FIG. 2 shows a block diagram of an apparatus for photo-based positioning according to a first embodiment of the present disclosure.

As shown in FIG. 2, the mobile device 200 according to the present disclosure may include a photo obtaining unit 201, a feature matching unit 202, a coordinate obtaining unit 203, a position calculating unit 204. The photo obtaining unit 201 may be configured to obtain a positioning photo taken by a mobile device within a predetermined space. The feature matching unit 202 may be configured to compare multiple feature elements exacted from sampling photos taken within the predetermined space in advance with the positioning photo to determine each feature element existing in the positioning photo. The coordinate obtaining unit 203 may be configured to obtain a first position coordinate of each feature element which is determined to exist in the positioning photo in a sampling photo corresponding to the positioning photo, and a second position coordinate of each feature element which is determined to exist in the positioning photo in the positioning photo. The position calculating unit 204 may be configured to calculate position parameters of the mobile device by using each of the obtained first position coordinate and second position coordinate, wherein the least number of feature elements existing in the positioning photo is determined according to the number of the position parameters.

According to one embodiment of the present disclosure, the position parameters include at least part of global coordinates x, y, z of the mobile device, direction coordinates Dx, Dy, Dz of the mobile device, and axial rotation angle θ in the photo-taking direction of the mobile device.

According to one embodiment of the present disclosure, the position calculating unit 204 may be further configured to build an equation set by using each of the obtained first position coordinate and second position coordinate, and solve the equation set to obtain the position parameters of the mobile device.

According to one embodiment of the present disclosure, the position calculating unit 204 may be further configured to build an equation for each feature element by intrinsic parameters of the photo-taking device and extrinsic parameters in connection with the first position coordinate and the second position coordinate so as to construct the equation set. Here, the photo-taking device may include the photo-taking device taking the sampling photos and the photo-taking device taking the positioning photo.

The above positioning photo and the sampling photo corresponding to the positioning photo refer to photos containing the same scene within the predetermined space. The above positioning photo may be a static photo, may also be a video frame extracted from a dynamic video. The above feature element may be one of a point and a straight line. In addition, the photo-based positioning apparatus 200 according to the first embodiment of the present disclosure may further include a visualization unit 205, a storage unit 206, a noise removing unit 207, and so on. The visualization unit 205 may be configured to display a pre-built map of the predetermined space on a display screen, and mark the location of the mobile device in the map according to the position parameters. The storage unit 206 may be configured to pre-store map data and the multiple feature elements. The storage unit 206 may also be configured to pre-store the sampling photos and the following parameters associated with the sampling photos: device parameters (intrinsic parameters) and extrinsic parameters of the photo-taking device, and the first position coordinate and the second position coordinate, for building an equation for each feature element so as to construct the equation set. The equation set is solved to obtain the position parameters. The device parameters may include but not limited one or more of the following: focal distance, resolution, length-to-width ratio, and image format. The noise removing unit 207 may be configured to remove feature elements exacted from sampling photos other than the sampling photo corresponding to the positioning photo from the feature elements determined to exist in the positioning photo. The above units are present only to assist the operations of the apparatus 200 of the present disclosure. The apparatus 200 of the present disclosure may realize the function and operation of photo-based positioning according to the present disclosure even if there are no the above units.

The above respective units (means) are coupled through command and/or data bus 203 in order to communicate with each other.

The above method and apparatus for photo-based positioning provided according to embodiments of the present disclosure may provide more precise position information and also direction information to perform precise navigation, shopping guidance and so on.

The above apparatus provided according to the embodiments of the present disclosure may be configured in at least one of the mobile device and the server communicatively coupled to the mobile device.

Figure 3:
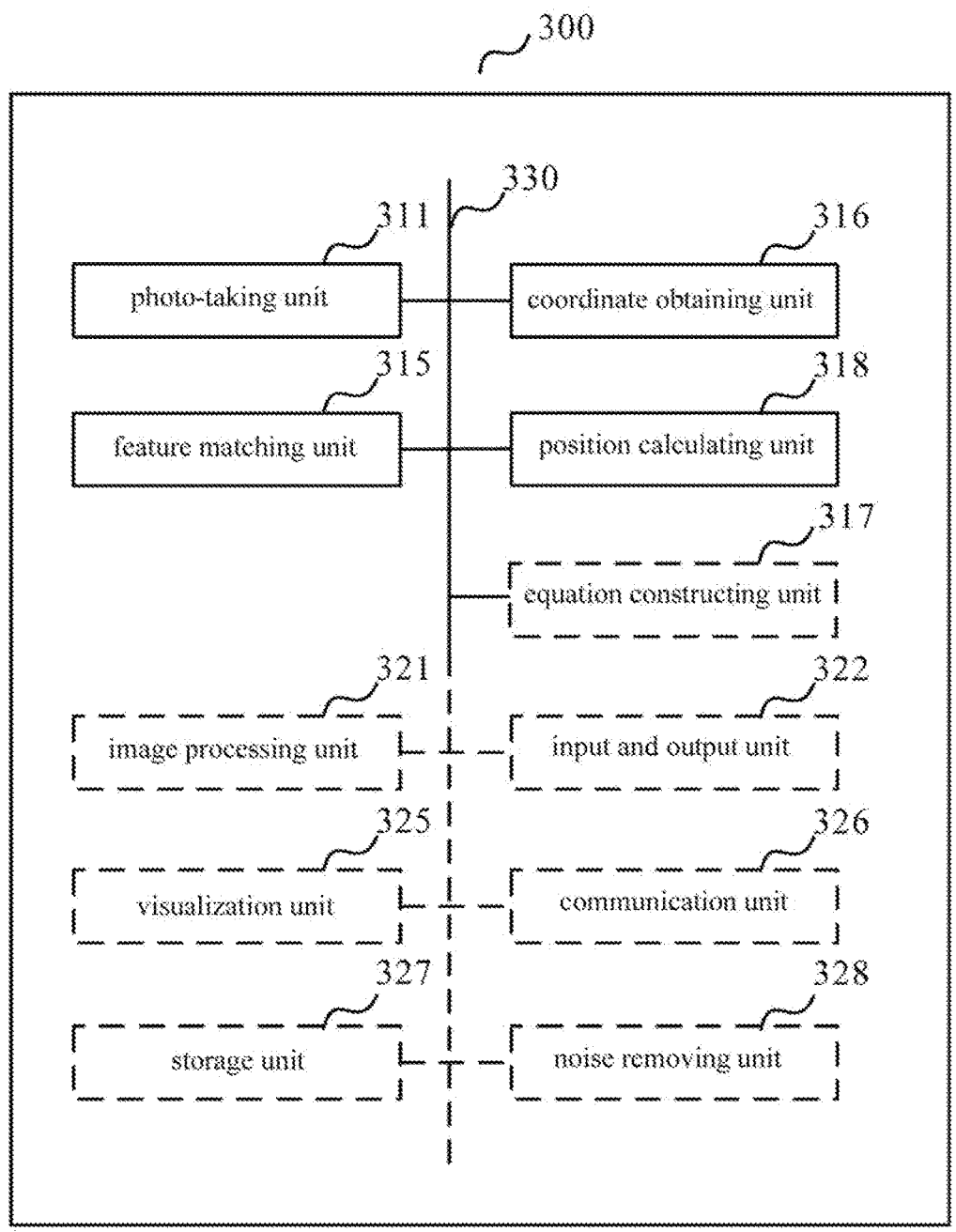
FIG. 3 shows a block diagram of a mobile device according to a second embodiment of the present disclosure.

FIG. 3 shows a block diagram of the mobile device according to a second embodiment of the present disclosure.

As shown in FIG. 3, the mobile device 300 according to the present disclosure may include a photo-taking unit 311 (for example, corresponding to the photo obtaining unit 201 in the first embodiment), a feature matching unit 315 (for example, corresponding to the feature matching unit 202 in the first embodiment), a coordinate obtaining unit 316 (for example, corresponding to the coordinate obtaining unit 203 in the first embodiment), and a position calculating unit 318 (for example, corresponding to the position calculating unit 204 in the first embodiment). The mobile device 300 may be but not limited to a mobile phone, a personal digital assistant (PDA), a wearable device (e.g. smart glasses), and so on.

In the mobile device 300, the photo-taking unit 311 is for example a camera or the like configured in the mobile device 300, which is configured to take photos of the scene within a predetermined space to obtain a positioning photo, i.e. a positioning photo taken by the mobile device within a predetermined space is obtained. The matching unit 315 is configured to compare multiple feature elements exacted from sampling photos taken within the predetermined space in advance with the above positioning photo to determine each feature element existing in the positioning photo. The coordinate obtaining unit 316 is configured to obtain a first position coordinate of each feature element which is determined to exist in the positioning photo in a sampling photo corresponding to the positioning photo, and a second position coordinate of each feature element which is determined to exist in the positioning photo in the positioning photo. The position calculating unit 318 is configured to calculate position parameters of the mobile device by using each of the obtained first position coordinate and second position coordinate, wherein the least number of feature elements existing in the positioning photo is determined according to the number of the position parameters.

According to one embodiment of the present disclosure, the position parameters include at least part of global coordinates x, y, z of the mobile device, direction coordinates Dx, Dy, Dz of the mobile device, and axial rotation angle θ in the photo-taking direction of the mobile device.

According to one embodiment of the present disclosure, the mobile device 300 may also include an equation constructing unit 317 configured to build an equation set by using each obtained first position coordinate and second position coordinate, and solve the equation set to obtain the position parameters of the mobile device.

According to one embodiment of the present disclosure, the equation constructing unit 317 may also be configured to build an equation for each feature element by intrinsic parameters and extrinsic parameters of the photo-taking device in connection with the first position coordinate and the second position coordinate so as to construct the equation set. Here, the photo-taking device may include the photo-taking device taking the sampling photos and the photo-taking device taking the positioning photo.

According to one embodiment of the present disclosure, the above positioning photo and the sampling photo corresponding to the positioning photo are photos containing the same scene within the predetermined space.

According to one embodiment of the present disclosure, the above positioning photo may be a static photo, or a video frame extracted from a dynamic video.

In addition, the mobile device 300 according to the present disclosure may also include an image processing unit 321, an input and output unit 322, a visualization unit 325, a communication unit 326, a storage unit 327, a noise removing unit 328, and so on.

In the above respective units, the image processing unit 321 may be configured to perform pre-processing on the sampling photos or the positioning photo in digital form or video frame in digital form taken by the photo-taking unit 311, for example, to recode each photo or video frame, or the like.

The input and output unit 322 may be for example a input means, such as physical buttons (e.g., keyboard, mouse, etc.), a touch screen, a microphone and so on configured on the mobile device 300, to input users' instructions to the mobile device 300, or may also be an output means for text, image and sound, such as a display screen, a speaker, and so on, to output text, image (video), sound, etc.

The visualization unit 325 is coupled to the display screen (not shown) of the mobile device 300, and may be configured to control the operations of displaying text, image, video, etc. on the display screen.

The communication unit 326 may be configured to perform communication with an external device such as a server, for example, receive data from a server device and send data to the server device.

The storage unit 327 may be for example a storage device such as a memory or a memory card configured in the mobile device 300, and so on, and may be configured to store various data, applications, and so on.

The noise removing unit 328 may be configured to remove wrongly matched feature elements from the feature elements determined to exist in the positioning photo. The wrongly matched feature elements refer to the feature elements not exacted from the sampling photo corresponding to the positioning photo.

According to one embodiment of the present disclosure, the above multiple feature elements may be pre-stored in the local storage unit (local library) 327 of the mobile device 300, or may be pre-stored in the storage unit of a server device and then be sent to the mobile device 300 by the server device.

The above respective units (means) are coupled through a command and/or data bus 330 to communicate with each other.

Each unit and means in the mobile device 300 according to the present disclosure may be realized by storing and executing software program in the units such as the system memory 28, the processor 16 and so on in the computer system/server 12 as shown in FIG. 1.

Figure 4:
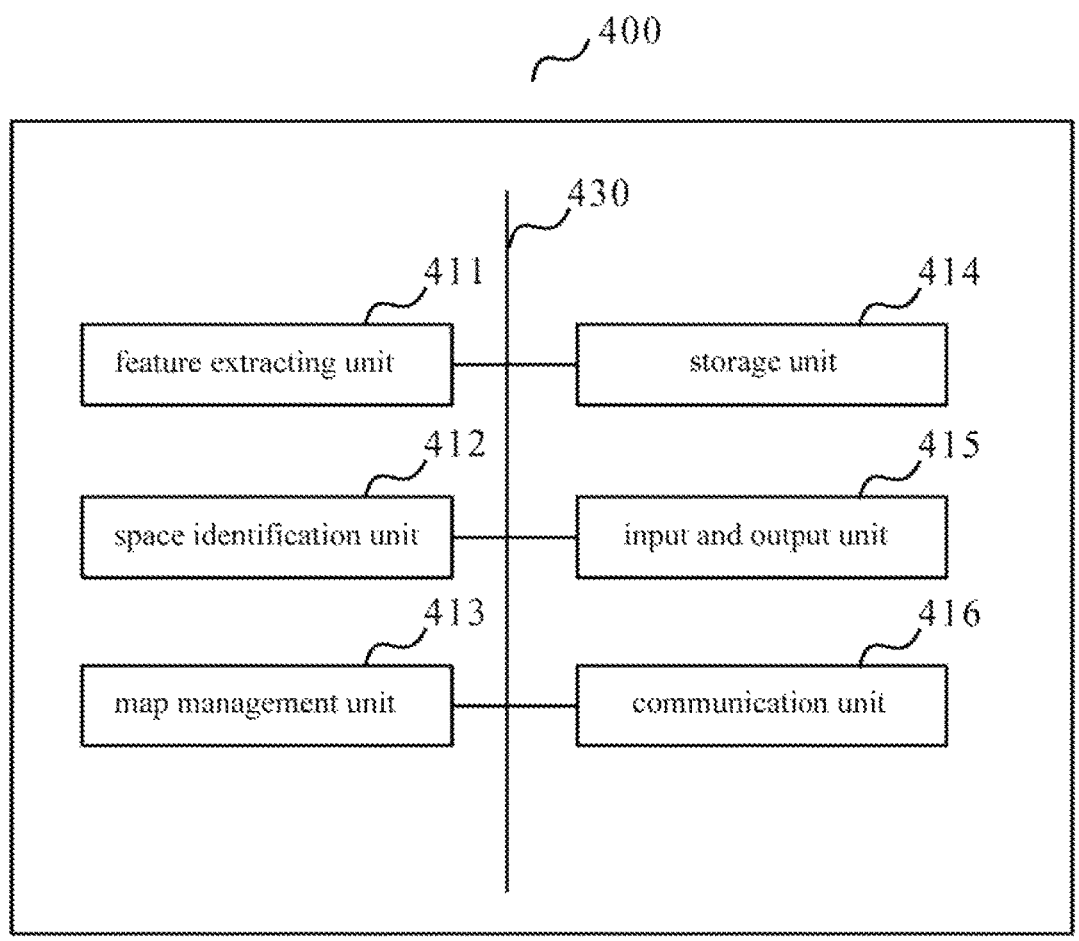
FIG. 4 shows a block diagram of a server according to the second embodiment of the present disclosure.

FIG. 4 shows a block diagram of a server device according to a second embodiment of the present disclosure.

As shown in FIG. 4, the server device 400 according to the present disclosure may include: a feature extracting unit 411, a space identification unit 412, a map management unit 413, a storage unit 414, an input and output unit 415, a communication unit 416 and so on. The above respective units (means) are coupled through a command and/or data bus 430 to communicate with each other.

The feature extracting unit 411 may be configured to extract feature elements such as feature point and feature line from at least one sampling photo sent from the mobile device 300.

The space identification unit 412 may be configured to identify the predetermined space where the positioning photo is located according to the positioning photo sent from the mobile device 300, and send identification data (SpaceID) of the predetermined space to the mobile device 300.

The map management unit 413 may be configured to receive map data of the predetermined space input from the outside, store the map data in the storage unit 414, and extract map data corresponding to the identification data of the predetermined space from the storage unit 414 according to the identification data of the predetermined space identified by the space identification unit 412, and send the map data to the mobile device 300 through the communication unit 416.

The storage unit 414 is for example a storage apparatus such as a memory configured in the server device 400, a memory card or the like, and may be configured to store various data, application program, and so on.

The input and output unit 415 may be for example a input means, such as physical buttons (e.g., keyboard, mouse, etc.), a touch screen, a microphone configured on the server device 400 and so on, to input users' instructions to the mobile device, or may also be an output means for text, image and sound, such as a display screen, a speaker, and so on, to output text, image (video), sound, etc.

The communication unit 416 may be configured to perform communication with external devices such as the mobile device 300, for example, receive data from the mobile device 300 and send data to the mobile device 300.

Each unit and means in the server device 400 according to the present disclosure may be realized by storing and executing software program in the units such as the system memory 28, the processor 16 and so on in the computer system/server 12 as shown in FIG. 1.

The mobile device 300 may communicate with the communication unit 416 in the server device 400 through the communication unit 326 to construct a positioning system according to the present disclosure.

In addition, the image processing unit 321, the input and output unit 322, the visualization unit 325, the communication unit 326, the storage unit 327, the noise removing unit 328 and so on included in the mobile device 300 according to the present disclosure are only to assist the operation of the mobile device 300 of the present disclosure. The mobile device 300 of the present disclosure may realize the function and operation of photo-based positioning according to the present disclosure even if there are no the above units.

Further, the feature extracting unit 411, the space identification unit 412, the map management unit 413, and the storage unit 414, the input and output unit 415, the communication unit 416 and so on included in the server device 400 according to the present disclosure are only to assist the operation of the server device 400 of the present disclosure. The server device 400 of the present disclosure may realize the function and operation of photo-based positioning according to the present disclosure even if there are no the above units.

In the positioning system according to the present disclosure, pre-preparation is needed.

Firstly, it is necessary to create a map of a predetermined space, define a spatial coordinate system based on the map, and define an origin and a coordinate system on the map to form complete map data of the predetermined space. The predetermined space may be outdoor space or in-door space. The above map data may be created in a device external to the positioning system of the present disclosure, then input into the server device 400 through the input and output unit 415 of the server device 400, and be stored in the storage unit 414 through the map management unit 413 therein. According to another embodiment of the present disclosure, the above map data may also be pre-stored in the storage unit 327 of the mobile device 300.

Secondly, it is necessary to design and select a series of sampling spots in the predetermined space and obtain the coordinate data of those sampling spots. Then, at each sampling spot, a photo-taking device such as a camera (not shown) is used to take photos of the surrounding scene within the predetermined space from multiple directions (for example, eight directions: east, west, south, north, southeast, southwest, northeast, northwest) in order to obtain sampling photos or sampling videos (in which video frames will be used), and corresponding parameters such as intrinsic device parameters of the photo-taking device, sampling spot coordinates, photo-taking directions, the identifier (ID) of the predetermined space and so on are associated with the taken sampling photos, and those data are stored in the storage unit 327 of the mobile device 300 or in the storage unit 414 of the server device 400. The above photo-taking device taking the sampling photos and the photo-taking unit 311 taking the positioning photo in the mobile device 300 in the following may be the same device or difference devices.

The case in which the above each parameter is stored in the mobile device 300 refer to taking sampling photos in multiple directions by a photo-taking device at multiple sampling spots selected within the predetermined space, and storing the obtained sampling photos (or video frames) and the device parameters of the photo-taking device, the positions of sampling spots, photo-taking directions and the identification data (ID) of the predetermined space associated to the obtained sampling photos (or video frames) in the storage unit 327 to be used in the operation of building the equation set described later. The above device parameters of the photo-taking device include but not limited to one or more of the following: focal distance, resolution, length-to-width ratio, image format.

When the above parameters are stored in the storage unit 414 of the server device 400, the communication unit 326 of the mobile device 300 may be configured to receive the device parameters of the photo-taking device, the positions of sampling spots, photo-taking directions and the identification data of the predetermined space associated to the sampling photos from the server device 400 to be used in the operation of building the equation set described later.

For example, a set of taken sampling photos have parameters C, D and A, where C represents the position of the photo-taking device which is the coordinate of the sampling spots here, D represents the direction of the photo-taking by the photo-taking device, and A represents the device parameters of the photo-taking device, such as focal distance, resolution, length-to-width ratio, image format of the camera, and so on.

The feature extracting unit 411 of the server device 400 may extract feature elements of the captured surrounding scenes within the predetermined space from those sampling photos. The feature elements may be feature points, or may be feature lines. The feature point may be an intersection point of two lines, or may be a center point of a circle or an ellipse. The feature line is a straight line. All feature elements extracted from one sampling photo are referred to as a feature image. Those feature elements in the feature image have the same position relationship between each other as in the sampling photo. In other words, a feature image according to the present disclosure corresponds to a sampling photo, and includes all feature elements extracted from the sampling photo. The extracted feature elements may be stored in the storage unit 314 of the server device 400, and may also be sent to the mobile device 300 and stored in the storage unit 327 of the mobile device 300 when a request from the mobile device 300 is received. For example, if the server device 400 receives a positioning photo (a photo taken for positioning) sent from the mobile device 300, the communication unit 416 of the server device 400 sends feature elements of all the scenes within the predetermined space where the positioning photo is located to the mobile device 300, and store them in the storage unit 327 of the mobile device 300.

Various data obtained by the above pre-preparation such as the map data of the predetermined space, the sampling photos (video frames), the multiple feature elements obtained from the sampling photos, and corresponding parameters such as intrinsic device parameters and extrinsic device parameters of the photo-taking device (camera), sampling spot coordinates, photo-taking directions, the identifier (ID) of the predetermined space and so on associated with the sampling photos may be stored in a library (e.g. feature location library FLL). The library may be stored in the storage unit 327 of the mobile device 300 or in the storage unit 414 of the server device 400 to be used in subsequent positioning operations.

Figure 5:
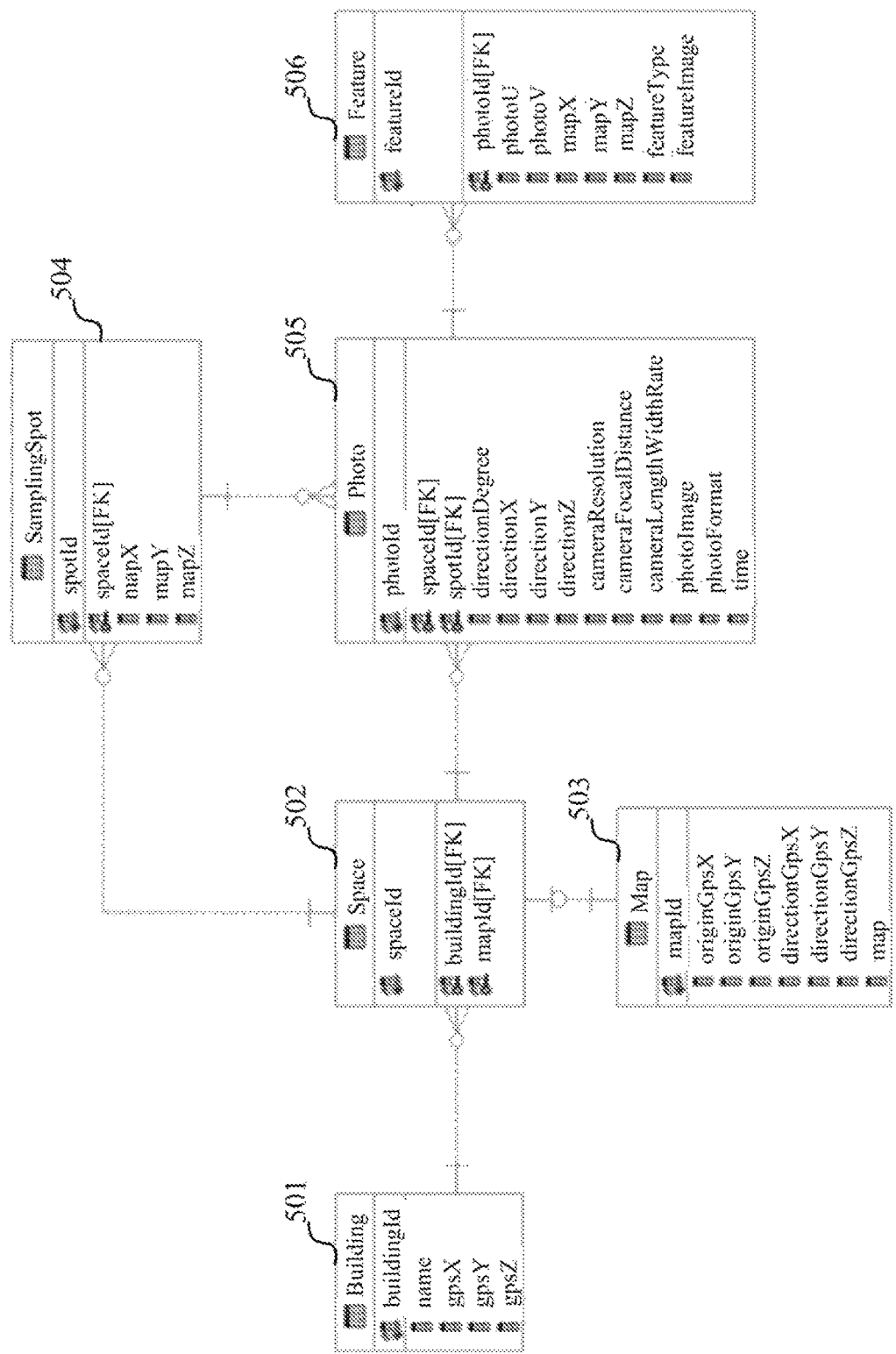
FIG. 5 shows an illustration of the data structures of various parameters.

FIG. 5 shows an illustration of the data structures of various parameters.

As shown in FIG. 5, the data structures may include for example six parts 501, 502, 503, 504, 505 and 506.

In the data structure 501, there show parameters on the building where the predetermined space is located, such as a building identifier (buildingID), a name, global coordinates of the building (gpsX, gpsY, gpsZ), etc.

In the data structure 502, there show parameters on the predetermined space in the building, such as a predetermined space identifier (spaceID), a map identifier of the predetermined space (mapID), and an identifier of the building to which the predetermined space belongs (buildingID).

In the data structure 503, there show parameters on the map of the predetermined space, such as a map identifier (mapID), origin coordinates of the map coordinate system (originGpsX, originGpsY, originGpsZ) and direction coordinates (directionGpsX, directionGpsY, directionGpsZ).

In the data structure 504, there show parameters on the selected sampling spots, such as a sampling spot identifier (spotID), coordinates of the sampling spot (mapX, mapY, mapZ), the predetermined space to which the sampling spot belongs (spaceID), and so on. As shown in the above, according to an embodiment of the present disclosure, the coordinates of the sampling spots (mapX, mapY, mapZ) are represented by "C".

In the data structure 505, there show parameters on captured sampling photos, such as a photo identifier (photoID), direction of photo-taking by camera (directionDegree, directionX, directionY, directionZ), camera resolution (cameraResolution), focal distance of camera (cameraFocalDistance), length-to-width rate of camera photos (cameraLengthWidthRate), photo content (photoImage), photo format (photoFormat), photo-taking time (time), and the predetermined space to which the photo belongs (spaceID) and the sampling spots (spotID). As shown in the above, according to an embodiment of the present disclosure, the direction of photo-taking by camera (directionDegree, directionX, directionY, directionZ) is represented by "D", the parameters such as camera resolution (cameraResolution), focal distance of camera (cameraFocalDistance), length-to-width rate of camera photos (cameraLengthWidthRate) and so on are represented by "A".

In the data structure 506, there show parameters on the extracted feature elements, such as identifier of the extracted feature elements (featureID), position coordinates of the feature elements in the photos (photoU, photoV), position coordinates of the feature elements in the map of the predetermined space (mapX, mapY, mapZ), i.e. position coordinates of sampling spots, type of feature elements (featureType: point or straight line), feature image (featureImage), the photo to which the feature element belongs (photoID), and so on.

In addition, in the above data structures, the following parameters are optional: one or more of camera resolution (cameraResolution), focal distance of camera (cameraFocalDistance) and length-to-width rate of camera photo (cameraLengthWidthRate); name of building (name), global coordinates of building (gpsX, gpsY, gpsZ), origin coordinates (originGpsX, originGpsY, originGpsZ), direction coordinates (directionGpsX, directionGpsY, directionGpsZ) of the map coordinate system, and so on.

In one embodiment according to the present disclosure, the method for extracting feature points, feature lines and feature images does not limit the scope of the present disclosure. Those skilled in the art may realize the extracting of feature points and feature lines in the present disclosure by using known feature extracting technologies such as outline extraction and point extraction algorithm, or pattern-based point extraction algorithm (for example, identifying the center point of a circle). For example, Corner detection is an approach used within computer vision systems to extract certain kinds of features and infer the contents of an image.

In the following, the operations of the mobile device 300 and the server device 400 performing positioning by taking photos according to embodiments of the present disclosure are described in connection with FIG. 3 and FIG. 4.

In the mobile device 300, a user initiates a positioning application pre-loaded in the mobile device 300. The positioning application takes photos of the surrounding scene within a predetermined space by using a photo-taking unit 311 configured in the mobile device 300. The photo-taking mode may be video-taking, or may take a single static photo (referred to as positioning photo hereafter). When the photo-taking mode is video-taking, a video frame is extracted as a static positioning photo for use. The video frame or position photo captured by the photo-taking unit 311 is input into the image processing unit 321.

The image processing unit 321 performs pre-processing on the captured positioning photo and/or video, for example, re-coding to reduce its size, and send it to server device 400 through the communication unit 326. At the same time, the mobile device 300 may also store the captured positioning photo and/or video frame in the local storage unit 327.

According to one embodiment of the present disclosure, if the map data of the predetermined space and multiple feature elements are stored in the server device 400, the communication unit 326 may be configured to send the positioning photo and/or video frame to the server device 400, and receive the map data of the predetermined space where the positioning photo and/or video frame is captured and multiple feature elements contained in the predetermined space from the server device 400.

In particular, in the server device 400, the communication unit 416 receives a positioning photo (or a video frame) sent from the mobile device 300, and sends it to the space identification unit 412. The space identification unit 412 compares the received positioning photo with a plurality of feature images stored in the library of the storage unit 414 to find a feature image corresponding to the positioning photo and identify the predetermined space (spaceID) to which the positioning photo belongs through the feature image. Then, the map management unit 413 sends the map identifier (mapID) of the identified predetermined space (spaceID) to the mobile device 300 through the communication unit 416, or the map management unit 413 sends the map data of the identified predetermined space (spaceID) and all feature elements (including feature points and feature lines) associated with the predetermined space directly to the mobile device 300.

If the map management unit 413 sends only the map identifier (mapID) to the mobile device 300, the mobile device 300 may send a request for downloading map data to the server device 400. After the server device 400 receives the request, the communication unit 326 of the mobile device 300 may download the map data of current predetermined space where the mobile device 300 is located and all feature elements associated with the predetermined space from the server device 400 through the map management unit 413 of the server device 400, and store the downloaded map data and feature elements in the local storage unit 327 of the mobile device 300.

The visualization unit 325 of the mobile device 300 may display the map of the predetermined space on the screen (not shown) configured in the mobile device 300 by using the downloaded map data of the predetermined space.

Next, the mobile device 300 takes a second positioning photo of the surrounding scene within the predetermined space, or extracts a second video frame from the captured video, and input it to the image processing unit 321. And, after the second positioning photo is subject to image processing, the mobile device 300 sends the second positioning photo subject to the image processing to the feature matching unit 315. The image processing unit 321 may also send the first positioning photo subject to the image processing to the feature matching unit 315 to perform matching calculation.

The feature matching unit 315 compares each feature element of the predetermined space stored in the local storage unit 327 with the received positioning photo to determine the feature elements existing in the received positioning photo. According to one embodiment of the present disclosure, the approach of determining whether each feature element of the predetermined space exists in the captured positioning photo does not limit the scope of the present disclosure. Those skilled in the art may realize the above determination of the present disclosure by using known determination approaches. For example, the determination may be performed by the process of overlaying two or more photos of the same scene taken at different times and from different viewpoints (Image Registration). Further, it is also possible to perform the determination by using the area-based image registration methods, for example, Correlation-like methods, Fourier methods, Mutual information methods, and so on.

For each feature element (feature point or feature line) existing in the positioning photo, the coordinate obtaining unit 316 obtains its position coordinates (u1, v1) in the sampling photo corresponding to the positioning photo and its position coordinates (u2, v2) in the positioning photo form the local storage unit 327. The position coordinates (u1, v1) of the feature element in the sampling photo and its position coordinates (u2, v2) in the positioning photo are stored in the library of the storage unit 327 as data intrinsic to the sampling photo and the positioning photo. Therefore, it is possible to obtain position coordinates (u1, v1) in the sampling photo corresponding to the positioning photo and position coordinates (u2, v2) in the positioning photo of multiple matched feature elements.

In the equation constructing unit 317, an equation is built for each matched feature point or feature straight line. Thereby several equations are built to form a joint equation set.

The position calculating unit 318 solves the above joint equation set to obtain coordinate data of current position C of the photo-taking unit (camera) 211.

The operations of the equation constructing unit 317 and the position calculating unit 318 will be described in detail as follows.

For a certain feature element S, the following matrix equation may be obtained:

$$\begin{bmatrix} u \\ v \\ 1 \end{bmatrix} = A[R \ T] \begin{bmatrix} x \\ y \\ z \\ 1 \end{bmatrix}$$

where u and v represent position coordinates of the feature element S in the sampling photo, x, y and z represent global coordinates of the scene corresponding to the feature element S, A represents intrinsic device parameters of the photo-taking device (camera) including focal distance, format of captured image, length-to-width rate, resolution and so on as described in the above, R and T represent rotation matrix and translation matrix respectively which are extrinsic parameters of the photo-taking device (camera). Those extrinsic parameters may also be pre-stored in the mobile device or in the server communicatively coupled to the mobile device.

$$A = \begin{bmatrix} \alpha_x & \gamma & u_0 \\ 0 & \alpha_y & v_0 \\ 0 & 0 & 1 \end{bmatrix},$$

$$\alpha_x = f \cdot m_x$$

$$\alpha_y = f \cdot m_y$$

where f represents focal distance, $m_x$ and $m_y$ represent distance-dependent scaling coefficients of pixels in the x direction and the y direction, $\gamma$ represents non-perpendicular distortion coefficient of x axis and y axis and is usually set as 0 since there is not distortion usually, $u_0$ and $v_0$ represent the origin of the image space.

$$T = \begin{bmatrix} 1 & 0 & 0 & v_x \\ 0 & 1 & 0 & v_y \\ 0 & 0 & 1 & v_z \\ 0 & 0 & 0 & 1 \end{bmatrix},$$

$$R = \begin{bmatrix} \cos\theta + u_x^2\left(\frac{1-}{\cos\theta}\right) & u_x u_y\left(\frac{1-}{\cos\theta}\right) - u_z\sin\theta & u_x u_z\left(\frac{1-}{\cos\theta}\right) + u_y\sin\theta \\ u_y u_x\left(\frac{1-}{\cos\theta}\right) - u_z\sin\theta & \cos\theta + u_y^2\left(\frac{1-}{\cos\theta}\right) & u_y u_z\left(\frac{1-}{\cos\theta}\right) - u_x\sin\theta \\ u_z u_x\left(\frac{1-}{\cos\theta}\right) - u_y\sin\theta & u_z u_y\left(\frac{1-}{\cos\theta}\right) + u_x\sin\theta & \cos\theta + u_z^2\left(\frac{1-}{\cos\theta}\right) \end{bmatrix}$$

where $u_x$, $u_y$, $u_z$, $v_x$, $v_y$ and $v_z$ represent the conversion coefficients of the world coordinate origin in the image coordinate system of the photo-taking device (camera) respectively, $\theta$ represents the rotation angle about the axis of the photo-taking direction of the photo-taking device (camera).

In the following, a more specific example will be described.

Figure 6:
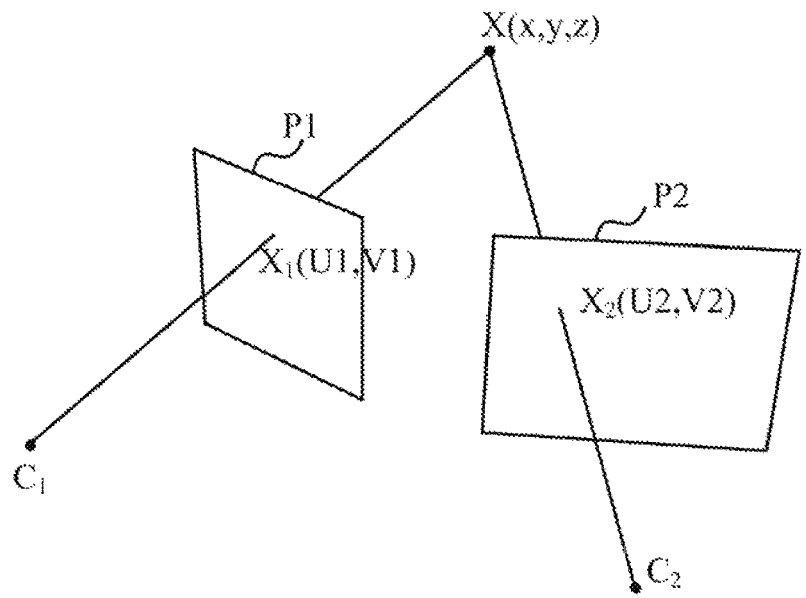
FIG. 6 shows an explanatory illustration of taking photos for positioning according to an embodiment of the present disclosure.

FIG. 6 shows an explanatory illustration of taking photos for positioning according to an embodiment of the present disclosure As shown in FIG. 6 which illustrates a schematic diagram of taking photos of the same scene at different locations, a certain feature element in the scene is X (x, y, z), a sampling photo taken on the scene is represented by P1, a positioning photo taken on the scene is represented by P2, the position of the feature element in the sampling photo P1 is X1 (u1, v1), and the position of the feature element in the positioning photo P2 is X2 (u2, v2). The following equations may be obtained:

$$\begin{bmatrix} u1 \\ v1 \\ 1 \end{bmatrix} = A1[R1 \ T1] \begin{bmatrix} x \\ y \\ z \\ 1 \end{bmatrix} \text{ and} \quad (1)$$

$$\begin{bmatrix} u2 \\ v2 \\ 1 \end{bmatrix} = A2[R2 \ T2] \begin{bmatrix} x \\ y \\ z \\ 1 \end{bmatrix} \quad (2)$$

where u1 and v1 represent position coordinates of the feature element of the scene in the sampling photo; u2 and v2 represent position coordinates of the feature element in the positioning photo; A1 and A2 are intrinsic parameters of the photo-taking device taking the sampling photo and the photo-taking unit 311 taking the positioning photo which are known; R1 and T1 are extrinsic parameters of the photo-taking device when taking the sampling photo which are known; and x, y and z are global coordinates of the scene corresponding to the feature elements.

The following equation may be obtained by the above equation (1) and equation (2):

$$A_2^{-1}[R_2 T_2]^{-1} \begin{bmatrix} u_2 \\ v_2 \\ 1 \end{bmatrix} = A_1^{-1}[R_1 T_1]^{-1} \begin{bmatrix} u_1 \\ v_1 \\ 1 \end{bmatrix} \quad (3)$$

In other words, with the intrinsic parameters A1, A2 and the extrinsic parameters R1 and T1 of the photo-taking device, the position parameters u1, v1 (the first position coordinate) of the feature element in the sampling photo, the position parameters u2, v2 (the second position coordinate) of the feature element in the positioning photo, it is possible to build the matrix equation as shown in the above equation (3). Here, the photo-taking devices include the photo-taking device taking the sampling photo and the photo-taking device taking the positioning photo.

In the above matrix equation (3), only matrices R2 and T2 are known, and they are the extrinsic parameters of the photo-taking unit (camera) 311 when taking the positioning photo, including a parameter of position C2 of the photo-taking unit (camera) 311 when taking the positioning photo. Therefore, as long as the parameters in R2 and T2 are obtained, the position of the photo-taking unit (camera) 311, i.e. the location of the mobile device 300, may be known.

As shown in the above, matrices R2 and T2 contain multiple unknown parameters on the position of the photo-taking device (here, photo-taking unit 311).

According to an embodiment of the present disclosure, matrices R2 and T2 may contain 7 unknown parameters, which are global coordinates x, y, z, direction coordinates Dx, Dy, Dz of the mobile device, and axial rotation angle θ in the photo-taking direction of the mobile device (that is, θ represents a rotation angle about the axis of the photo-taking direction of the photo-taking unit 311). Therefore, at least 7 equations as shown by equation (3) need to be built to form a joint equation set and then obtain R2 and T2. According to an embodiment of the present disclosure, it is possible to determine at least 7 matched feature points or feature lines in one positioning photo, and build one equation for each matched feature point or feature line by equation constructing unit 317 to form an equation set. As described in the above, the above equation set includes at least 7 equations each of which corresponds to one feature element.

According to another embodiment of the present disclosure, under some condition, R2 and T2 may not contain all the 7 unknown parameters, but only contain part of them, for example, contain only global coordinates x, y, z of the mobile device, but not contain direction coordinates Dx, Dy, Dz or axial rotation angle θ of the mobile device. For example, when the direction or axial rotation angle of the mobile device is not needed, the above direction coordinates Dx, Dy, Dz and axial rotation angle θ may be set as certain constants. In this case, only 3 equations as shown by equation (3) need to be built to create a joint equation set, in order to obtain unknown parameters (global coordinates x, y, z) in R2 and T2. At this point, it is possible to determine at least 3 matched feature points or feature lines in one positioning photo, and build one equation for each matched feature point or feature line by equation constructing unit 317 to form an equation set.

According to yet another embodiment of the present disclosure, under some condition, R2 and T2 may contain only global coordinates x, y, z and direction coordinates Dx, Dy, Dz of the mobile device, but not contain the axial rotation angle θ.

Therefore, according to different embodiments of the present disclosure, the position parameters may include at least part of the following parameters: global coordinates x, y, z of the mobile device, direction coordinates Dx, Dy, Dz of the mobile device, and axial rotation angle θ in the photo-taking direction of the mobile device.

According to an embodiment of the present disclosure, the least number of equations required to be built is determined according to the number of unknown parameters in the position parameters to build an equation set. Of course, the number of equations built to form the equation set may also be larger than the number of unknown parameters in the position parameters. In this case, the larger the number of equations contained in the above equation set is, the higher the speed of the solution of the equation set is.

As shown in the above, C represents the position of the photo-taking unit (camera) 311 in the world coordinate system, and R and T represent the transformation of the origin of the world coordinate system in the image coordinate system of the photo-taking unit (camera) 311. In this case, the following equation exists:

$$RC+T=0$$

thereby: $RC=-T$ $$R^{-1}RC=-R^{-1}T$$

$$C=-R^{-1}T.$$

R is an orthogonal matrix, so $$R^{-1}=R^T$$

where $R^{-1}$ represents the inverse matrix of matrix R, and $R^T$ represents the transport matrix of matrix R. Thereby, the position equation of the photo-taking unit (camera) 311 when taking the positioning photo is obtained as $$C=-R^TT. \quad (4)$$

In the position calculating unit 318, it is possible to calculate the position parameters of position C of the photo-taking unit (camera) 311 in the world coordinate system based on the solved respective parameters of R2 and T2 as described in the above.

According to one embodiment of the present disclosure, the approach for building position equations of the photo-taking unit (camera) 311 does not limit the scope of the present disclosure. Those skilled in the art may employ any known methods to build the equations, such as direct linear transformation (DLT) method, a classical Roger Y. Tsai Algorithm method, "a flexible new technique", and so on.

According to one embodiment of the present disclosure, in the position calculating unit 318, the Singular Value Decomposition (SVD) method may be used to solve the above equation set to obtain the position coordinates and the photo-taking direction of the camera in current predetermined space. The more the equations contained in the above equation set is, the higher the speed of the solution of the equation set is.

The visualization unit 325 of the mobile device 300 may be configured to display a pre-built map of the predetermined space on a display screen, and mark the location of the mobile device 300 in the map according to the position parameters. As described in the above, the map data may be pre-stored in the storage unit 327 of the mobile device 300. The map data may also be pre-stored in the storage unit 414 of the server device 400, and be sent to the mobile device 300 after the server device 400 receives a positioning photo sent by the mobile device 300, and stored in the storage unit 327 of the mobile device 300.

The noise removing unit 328 according to the present disclosure may be configured to remove wrongly matched feature points or feature lines from the feature elements determined to exist in the positioning photo. Here, "wrongly matched" refers to a case in which respective feature elements of the predetermined space are extracted from multiple different sampling photos, so part of the feature elements existing therein are similar but come from different sampling photos. For example, assume features a, b, c come from sampling photo P1, but features c', d come from sampling photo P2, wherein feature c and feature c' are very similar. Even if the scene of the positioning photo taken by the photo-taking unit (camera) 311 is close to the sampling photo P1 when positioning, when the feature matching unit 315 performs determination, it is possible to identify the feature c' from the sampling photo P2 to match with the positioning photo. In this case, such a match is wrong match which causes the position calculating unit 318 to make mistakes when performing position calculation. Therefore, it is necessary to remove such wrongly matched feature elements.

According to one embodiment of the present disclosure, the approach for removing wrongly matched feature elements does not limit the scope of the present disclosure.

Those skilled in the art may employ known technologies of removing noise feature elements to realize the removing of noise feature points and noise feature lines of the present disclosure. For example, it is possible to build a view cone model (including view spot, view angle, view distance, etc.) for each image by the method of building View Cone Model, project the view cones into view triangles, and detect intersection content (i.e. overlapped content) between each reference image (obtained from sampling photos) and current image (positioning photo). The feature points or feature lines in the reference images which do not have intersection content with current image is noise feature elements which need to be removed from matched feature points and feature lines.

As described in the above, according to another embodiment of the present disclosure, in a case that map data related to a predetermined space, each sampling photo, each feature image (including feature point and feature line) related to each sampling photo, device parameters of the photo-taking unit 311, positions of sampling spots, photo-taking direction, identification data of the predetermined space and so on stored in the storage unit 414 of the server device 400 have small amount of data, one or more of the above various data may be stored directly in the local storage unit 327 of the mobile device 300. In this case, each time performing photo-taking for positioning, the mobile device 300 may not send the captured positioning photo to the server device 400 for positioning, but perform the positioning operation in the mobile device 300 per se. As such, band resource required for frequent communication between the mobile device 300 and the server device 400 may be saved.

Figure 7:
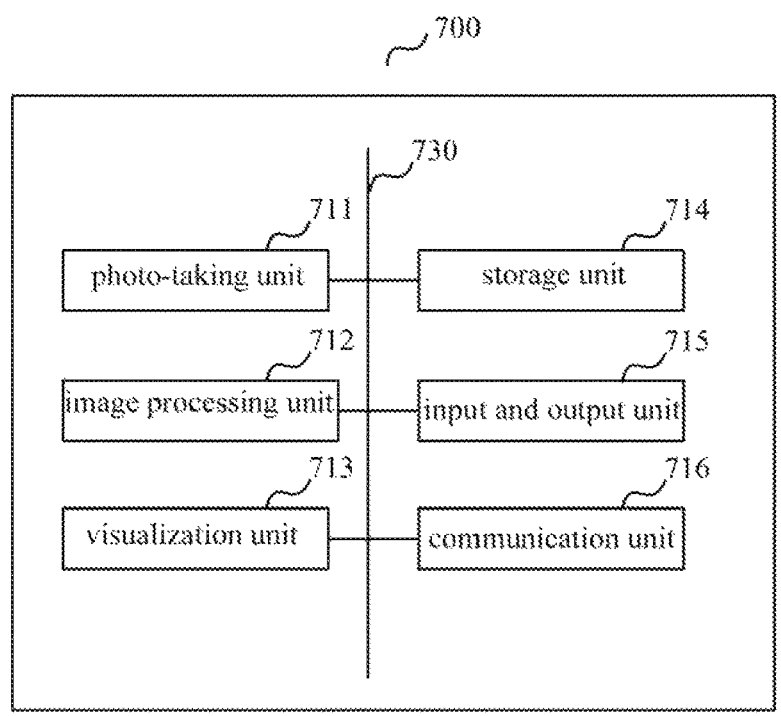
FIG. 7 shows a block diagram of a mobile device according to a third embodiment of the present disclosure.

FIG. 7 shows a block diagram of the mobile device according a third embodiment of the present disclosure.

As shown in FIG. 7, the mobile device 700 according to the third embodiment of the present disclosure may include a photo-taking unit 711, an image processing unit 712, a visualization unit 713, a storage unit 714, an input and output unit 715, a communication unit 716, and so on. The mobile device 700 may be but not limited to a mobile phone, a personal digital assistant (PDA), a wearable device (e.g. smart glasses), and so on.

The photo-taking unit 711 may for example be a camera configured in the mobile device 700, and configured to take photos of scene in a predetermined space to obtain a positioning photo. According to one embodiment of the present disclosure, the above positioning photo may be a static photo or a video frame extracted from a dynamic video.

The image processing unit 712 performs pre-processing on the static photo or video frame taken by the photo-taking unit 711, for example, recodes the static photo or video frame, or the like.

The input and output unit 715 may be for example a input means, such as physical buttons (e.g., keyboard, mouse, etc.), a touch screen, a microphone configured on the mobile device 700 and so on, to input users' instructions to the mobile device 700, or may also be an output means for text, image and sound, such as a display screen, a speaker, and so on, to output text, image (video), sound, etc.

The visualization unit 713 is coupled to the display screen (not shown) of the mobile device 700, and configured to control the operations of displaying text, image, etc. on the display screen.

The communication unit 716 may be configured to perform communication with an external device such as a server, for example, receive data from a server device and send data to the server device.

The storage unit 714 may be for example a storage device such as a memory configured in the mobile device 700, a memory card and so on, and may be configured to store various data, applications, and so on. The above respective units (means) are coupled through command and/or data bus 730 to communicate with each other.

Each unit and means in the mobile device 700 according to the present disclosure may also be realized by storing and executing software program in the units such as the system memory 28, the processor 16 and so on in the computer system/server 12 as shown in FIG. 1.

Figure 8:
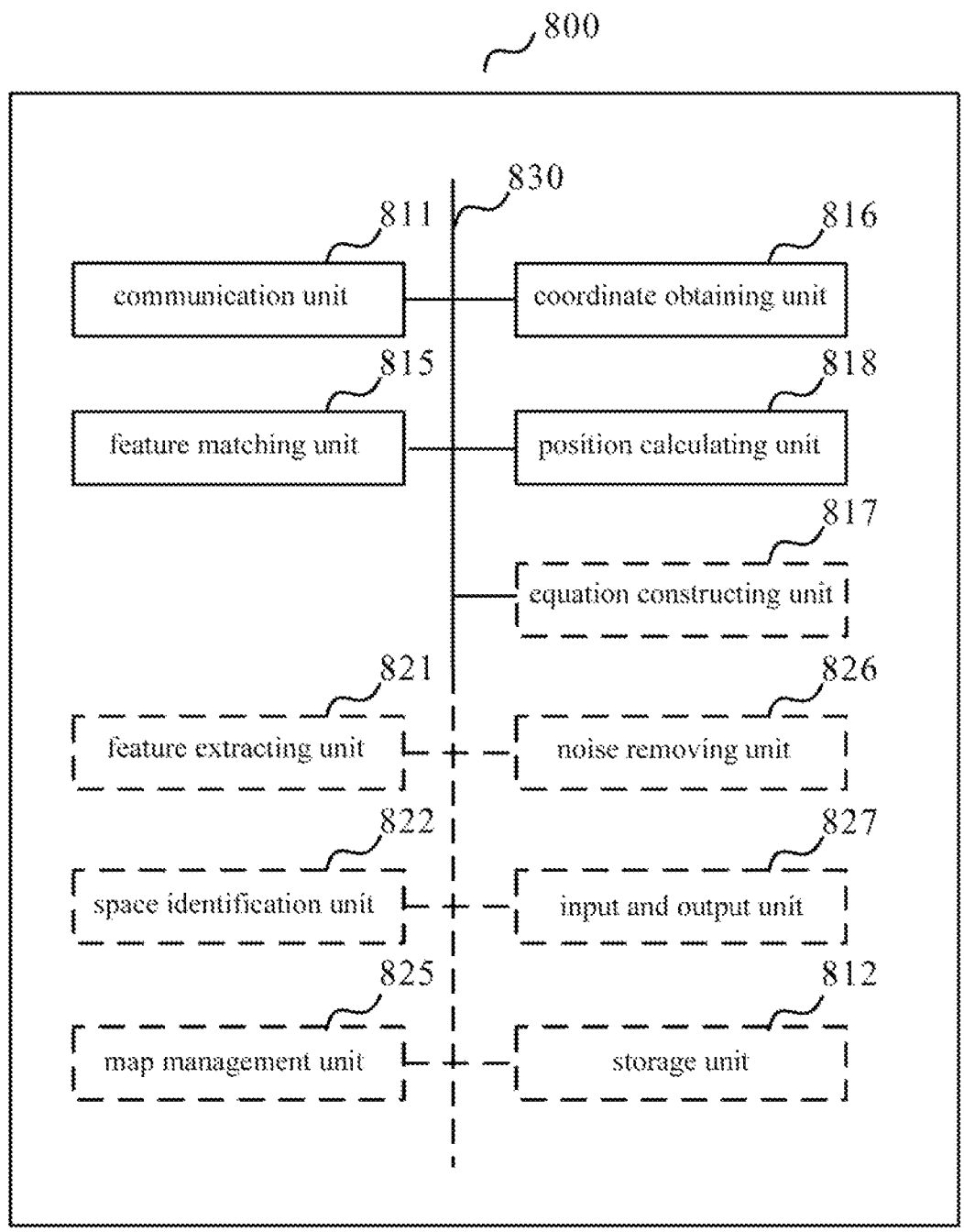
FIG. 8 shows a block diagram of a server according to the third embodiment of the present disclosure.

FIG. 8 shows a block diagram of a server device according to a third embodiment of the present disclosure.

As shown in FIG. 8, the server device 800 according to the present disclosure may include a communication unit 811 (for example, corresponding to the photo obtaining unit 201 in the first embodiment), a feature matching unit 815 (for example, corresponding to the feature matching unit 202 in the first embodiment), a coordinate obtaining unit 816 (for example, corresponding to the coordinate obtaining unit 203 in the first embodiment), a position calculating unit 818 (for example, corresponding to the position calculating unit 204 in the first embodiment) and so on.

In the server device 800, the communication unit 811 may be configured to receive a positioning photo obtained by a mobile device taking photo of a scene within a predetermined space, i.e., a positioning photo taken by a mobile device within a predetermined space is obtained. The feature matching unit 815 is configured to compare multiple feature elements exacted from sampling photos taken within the predetermined space in advance with the positioning photo to determine each feature element existing in the positioning photo. The coordinate obtaining unit 816 is configured to obtain a first position coordinate of each feature element which is determined to exist in the positioning photo in a sampling photo corresponding to the positioning photo, and a second position coordinate of each feature element which is determined to exist in the positioning photo in the positioning photo. The position calculating unit 818 is configured to calculate position parameters of the mobile device by using each of the obtained first position coordinate and second position coordinate, wherein the least number of feature elements existing in the positioning photo is determined according to the number of the position parameters.

According to one embodiment of the present disclosure, the above position parameters include at least part of global coordinates x, y, z of the mobile device, direction coordinates Dx, Dy, Dz of the mobile device, and axial rotation angle $\theta$ in the photo-taking direction of the mobile device.

According to one embodiment of the present disclosure, the server device 800 may also include an equation constructing unit 817 configured to build an equation set by using each of the obtained first position coordinate and second position coordinate, and solve the equation set to obtain the position parameters of the mobile device.

According to one embodiment of the present disclosure, the equation constructing unit 817 may also be configured to build an equation for each feature element by intrinsic parameters and extrinsic parameters of the photo-taking device in connection with the first position coordinate and the second coordinate so as to construct the equation set. Here, the photo-taking device may include the photo-taking device taking the sampling photos and the photo-taking device taking the positioning photo.

According to one embodiment of the present disclosure, the photo-taking unit 711 and the communication unit 716 of the mobile device 700 may constitute a part of the photo obtaining unit 201 of the first embodiment for obtaining the positioning photo taken by the mobile device.

According to one embodiment of the present disclosure, the communication unit 811 may also be configured to send the calculated position parameters of the mobile device to the mobile device. According to another embodiment of the present disclosure, the server device 800 may also include a storage unit 812. The storage unit 812 may be for example a storage device such as a memory configured in the server device 800, a memory card and so on, and may be configured to store pre-created map data of the predetermined space. The communication unit 811 is also configured to: in response to receiving the positioning photo sent from the mobile device, send the map data of the predetermined space corresponding to the positioning photo to the mobile device, and store the map data in the local storage unit 714 of the mobile device 700.

The storage unit 812 may also be configured to pre-store the multiple feature elements, the sampling photos and the following parameters associated with the sampling photos: device parameters of the photo-taking device, position data of sampling spots, photo-taking direction data and data of the predetermined space, for calculating the position parameters of the mobile device. The device parameters may include but not limited to focal distance, resolution, length-to-width rate, and image format.

According to another embodiment of the present disclosure, the server device 800 may also include a feature extracting unit 821, a space identification unit 822, a map management unit 825, a noise removing unit 826, an input and output unit 827 and so on.

The feature extracting unit 821 may be configured to extract feature elements such as feature point and feature line from the sampling photo sent from the mobile device 700 through the communication unit 716.

The space identification unit 822 may be configured to identify the predetermined space where the positioning photo is located (the predetermined space corresponding to the positioning photo) according to the positioning photo sent from the mobile device 700, and send identification data (SpaceID) of the predetermined space to the mobile device 700.

The map management unit 825 may be configured to receive map data of the predetermined space from the outside, store the map data in the storage unit 812, and extract map data corresponding to the identification data of the predetermined space from the storage unit 812 according to the identification data of the predetermined space identified by the space identification unit 822, and send the map data to the mobile device 700 through the communication unit 811.

The input and output unit 827 may be for example a input means, such as physical buttons (e.g., keyboard, mouse, etc.), a touch screen, a microphone configured on the server device 300 and so on, to input users' instructions, or may also be an output means for text, image and sound, such as a display screen, a speaker, and so on, to output text, image (video), sound, etc.

The noise removing unit 826 may be configured to remove wrongly matched feature elements from the feature elements determined to exist in the positioning photo. The wrongly matched feature elements refer to the feature elements not exacted from the sampling photo corresponding to the positioning photo.

The communication unit 811 is generally configured to communicate with external devices such as the mobile device 700, for example, receive data from the mobile device 700 or send data to the mobile device 700.

In addition, the functions of the units in the mobile device 700 are only auxiliary. The server device 800 of the present disclosure may realize the function and operation of photo-based positioning according to the present disclosure even if there are no such units.

The feature extracting unit 821, the space identification unit 822, the map management unit 825, the storage unit 812, an input and output unit 827, the noise removing unit 826 of the server device 800 are present only to assist the operation of the server device 800 of the present disclosure. The server device 800 of the present disclosure may realize the function and operation of photo-based positioning according to the present disclosure even if there are no such units.

The above respective units (means) are coupled through command and/or data bus 830 to communicate with each other.

Each unit and means in the server device 800 according to the present disclosure may be realized by storing and executing software program in the units such as the system memory 28, the processor 16 and so on in the computer system/server 12 as shown in FIG. 1.

The mobile device 700 may communicate with the communication unit 811 of the server device 800 through the communication unit 716 to configure the positioning system according to the present disclosure.

The positioning system according to the third embodiment of the present disclosure differs from the positioning system according to the second embodiment of the present disclosure in that the units or function modules related to the position calculation such as the feature matching unit, the coordinate obtaining unit, the position calculation unit and so on are moved from the mobile device to the server device. As such, it is possible to transfer a large amount of computation required by the position calculation to the server so as to reduce the calculation amount of the mobile device and thus reduce the complexity of the mobile device.

In the following, the positioning operation of the mobile device 700 and the server device 800 according to the third embodiment of the present disclosure will be described in detail in connection with FIG. 7 and FIG. 8.

The preparation required in the server device 800 is the same as the preparation in the server device 400, and details thereof are omitted here.

In the following, the positioning operation will be described.

In particular, in the mobile device 700, a user initiates a positioning application pre-loaded in the mobile device 700. The positioning application takes photos of the surrounding scene within a predetermined space by using a photo-taking unit (camera) 711 configured in the mobile device 700. The photo-taking mode may be video-taking, or may be taking one single static photo (referred to as positioning photo hereafter). When the photo-taking mode is video-taking, a video frame therein is extracted as a static positioning photo for use. The video frame or position photo captured by the photo-taking unit 711 is input into the image processing unit 712.

The image processing unit 712 performs pre-processing on the captured positioning photo, for example, re-coding to reduce its size, and send it to server device 800 through the communication unit 716. At the same time, the mobile device 700 may also store the captured positioning photo in the local storage unit 714.

In the server device 800, the communication unit 811 receives a positioning photo sent from the mobile device 700, and sends it to the space identification unit 822. The space identification unit 822 compares the received positioning photo with a feature image (including a plurality of feature elements) stored in the library of the storage unit 812 to identify the predetermined space (spaceID) to which the positioning photo belongs. Then, the map management unit 825 sends the map identifier (mapID) of the identified current predetermined space (spaceID) to the mobile device 700, or the map management unit 825 sends the map data of the identified current predetermined space (spaceID) directly to the mobile device 700.

If the map management unit 825 sends only the map identifier (mapID) to the mobile device 700, the mobile device 700 may send a request for downloading map data to the server device 800 through the communication unit 716. After the server device 800 receives the request, the communication unit 716 of the mobile device 700 may download the map data of current predetermined space where the mobile device 700 is located through the map management unit 825 of the server device 800, and store the downloaded map data in the local storage unit 714 of the mobile device 700.

The visualization unit 713 of the mobile device 700 may display the map of the predetermined space on the screen configured in the mobile device 700 by using the downloaded map data of the predetermined space.

Next, the mobile device 700 takes a second positioning photo within the predetermined space, or extracts a second video frame from the captured video, and input it to the image processing unit 712. After the second positioning photo is subject to the image processing, the mobile device 700 sends it to the server device 800 through the communication unit 716. The image processing unit 712 may also send the first positioning photo subject to the image processing to the server device 800 to perform position calculation.

In the server device 800, the communication unit 811 receives the captured second positioning photo from the mobile device 700 (or uses the first positioning photo), and sends the received positioning photo to the feature matching unit 815.

The structures and functions of the feature matching unit 815, the coordinate obtaining unit 816, the equation constructing unit 817, the position calculating unit 818, the noise removing unit 826 and so on for position calculation in the server device 800 according to the third embodiment of the present disclosure are the same as that of the feature matching unit 315, the coordinate obtaining unit 316, the equation constructing unit 317, the position calculating unit 318, the noise removing unit 328 and so on in the mobile device 300 according to the second embodiment of the present disclosure, so the description thereof is omitted here.

Therefore, it is possible to calculate parameters of current position of the mobile device 700 in the server device 800 through the above communication unit 811, feature matching unit 815, coordinate obtaining unit 816, position calculating unit 818 and so on.

The server device 800 may send the calculation result, i.e. the parameters of current position of the mobile device 700, to the mobile device 700 through the communication unit 811. The communication unit 716 of the mobile device 700 sends the position parameters to the visualization unit 713 after receiving the position parameters sent from the server device 800. The visualization unit 713 marks the current position of the mobile device 700 in the map displayed in the display screen according to the position parameters of the mobile device 700.

Figure 9:
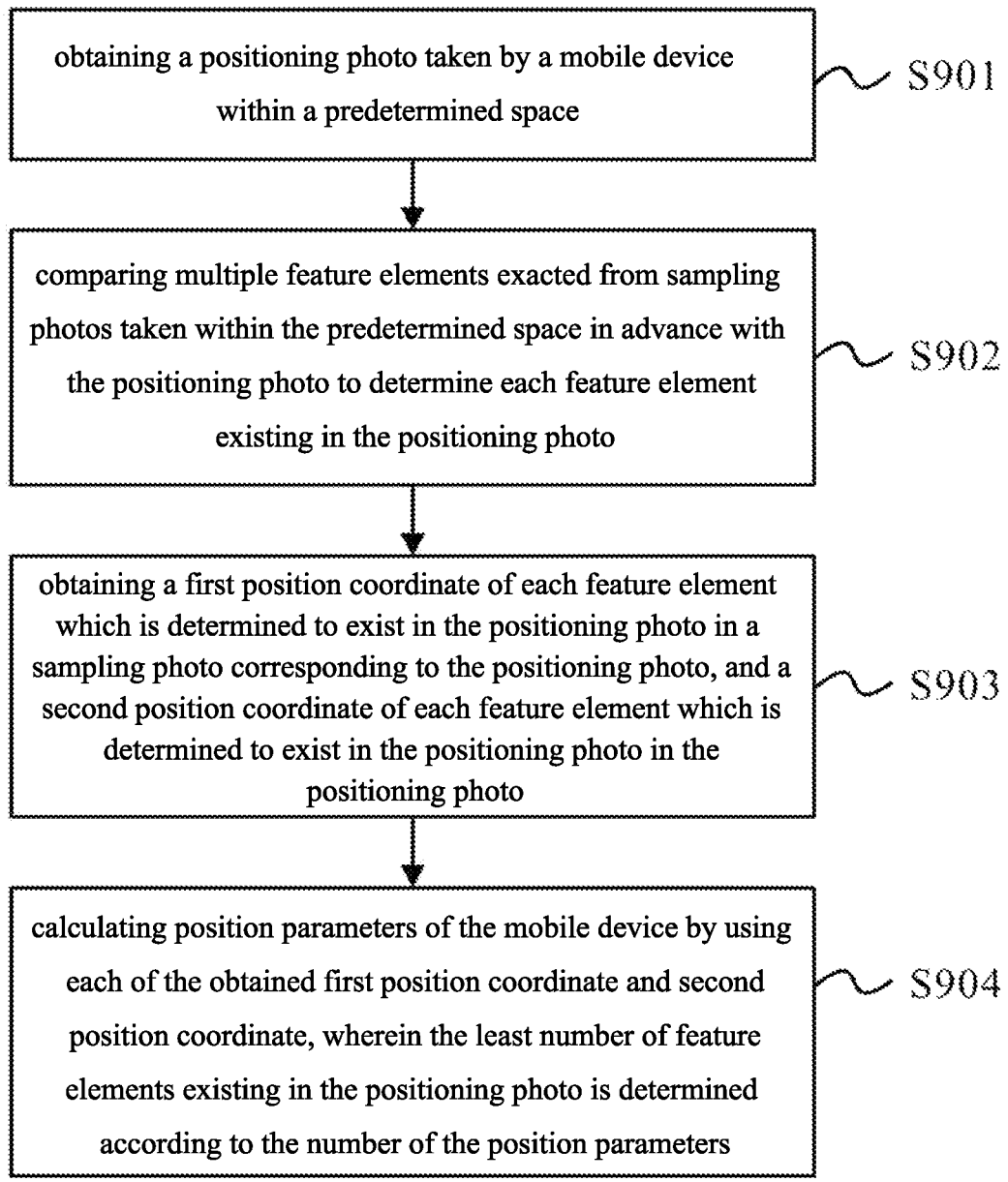
FIG. 9 shows a flowchart of a method of photo-based positioning according to an embodiment of the present disclosure.

FIG. 9 shows a flowchart of the method of photo-based positioning according to an embodiment of the present disclosure.

As shown in FIG. 9, the method may include: an operation S901 of obtaining a positioning photo taken by a mobile device within a predetermined space; an operation S902 of comparing multiple feature elements exacted from sampling photos taken within the predetermined space in advance with the positioning photo to determine each feature element existing in the positioning photo; an operation S903 of obtaining a first position coordinate of each feature element which is determined to exist in the positioning photo in a sampling photo corresponding to the positioning photo, and a second position coordinate of each feature element which is determined to exist in the positioning photo in the positioning photo; and an operation 904 of calculating position parameters of the mobile device by using each of the obtained first position coordinate and second position coordinate, wherein the least number of feature elements existing in the positioning photo is determined according to the number of the position parameters.

According to one embodiment of the present disclosure, the position parameters include at least part of global coordinates x, y, z of the mobile device, direction coordinates Dx, Dy, Dz of the mobile device, and axial rotation angle θ in the photo-taking direction of the mobile device.

According to one embodiment of the present disclosure, calculating the position parameters of the mobile device further includes: building an equation set by using each of the obtained first position coordinate and second position coordinate, and solving the equation set to obtain the position parameters of the mobile device.

According to one embodiment of the present disclosure, building the equation set further includes: building an equation for each feature element by intrinsic parameters and extrinsic parameters of the photo-taking device in connection with the first position coordinate and the second coordinate so as to construct the equation set. Here, the photo-taking device may include the photo-taking device taking the sampling photos and the photo-taking device taking the positioning photo.

According to one embodiment of the present disclosure, the positioning photo and the sampling photo corresponding to the positioning photo are photos containing the same scene within the predetermined space.

According to one embodiment of the present disclosure, the above method may further include an operation of removing wrongly matched feature elements from the feature elements determined to exist in the positioning photo. The wrongly matched feature elements refer to the feature elements exacted from sampling photos other than the sampling photo corresponding to the positioning photo.

According to one embodiment of the present disclosure, the above method may further include an operation of marking the location of the mobile device on a pre-built map of the predetermined space according to the position parameters.

According to one embodiment of the present disclosure, the map data and the multiple feature elements are pre-stored in at least one of the mobile device and the server communicatively coupled to the mobile device. The sampling photos and the following parameters associated with the sampling photos: device parameters of the photo-taking device, position data of sampling spots, photo-taking direction data and data of the predetermined space, are also pre-stored in at least one of the mobile device and the server communicatively coupled to the mobile device for calculating the position parameters of the mobile device. The device parameters of the photo-taking device may include but not limited one or more of the following: focal distance, resolution, length-to-width rate, and image format.

According to one embodiment of the present disclosure, if the map data and the multiple feature elements are pre-stored in the server communicatively coupled to the mobile device, the above method may also include sending the positioning photo to the server and receiving the map data of the predetermined space and the multiple feature elements from the server, after taking the positioning photo.

According to one embodiment of the present disclosure, the positioning photo is one of a static photo and a video frame extracted from a dynamic video.

According to one embodiment of the present disclosure, the feature element is a point or a straight line. The feature point may be an intersection point of two lines, or may be a center point of a circle or an ellipse.

According to one embodiment of the present disclosure, the above method is performed in at least one of the mobile device and the server communicatively coupled to the mobile device.

Figure 10:
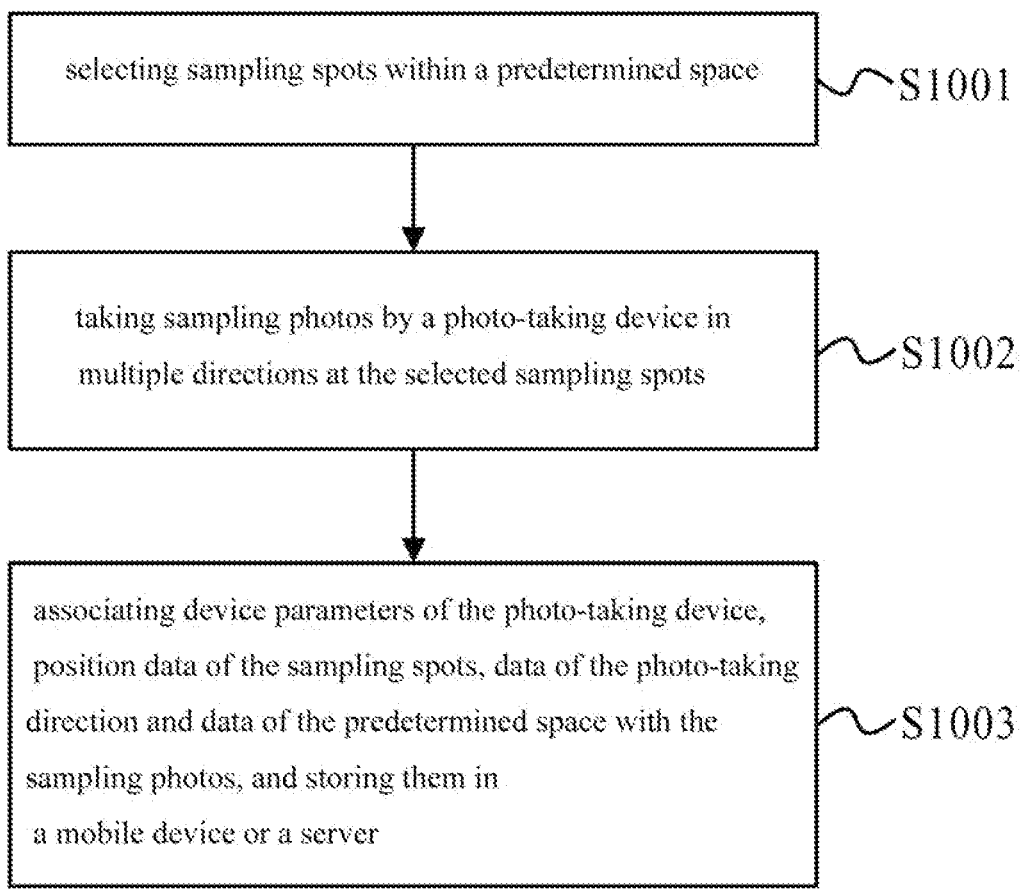
FIG. 10 shows a flowchart of a method of data pre-processing according to another embodiment of the present disclosure.

FIG. 10 shows a flowchart of the data pre-processing method according to another embodiment of the present disclosure.

As shown in FIG. 10, the method may include an operation S1001 of selecting sampling spots within a predetermined space; an operation S1002 of taking sampling photos by a photo-taking device in multiple directions at the selected sampling spots; an operation S1003 of associating device parameters of the photo-taking device, position data of the sampling spots, data of the photo-taking direction and data of the predetermined space with the sampling photos, and storing them in a mobile device or a server to be used for calculating position parameters of the mobile device in the photo-based positioning method as shown in FIG. 9. The device parameters include but not limited to focal distance, resolution, length-to-width rate, and image format.

In the above description, the method, apparatus, mobile device and server device of photo-based positioning according to respective embodiments of the present disclosure are described.

Connection and construction relationship of respective units (functional modules) in each embodiment of the present disclosure do not limit the scope of the present disclosure, they may be realized by incorporating into a single unit, or each of these units may be realized by dividing into multiple smaller units.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which includes one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The method, apparatus, mobile device, server device and computer program product of photo-based positioning according to embodiments of the present disclosure can provide more precise position information and also direction information to perform precise navigation, shopping guidance and so on. The technical solutions of the present disclosure can be used independently, or in combination with location services based on Wi-Fi and GPS to further improve their positioning precision.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A photo-based positioning method, comprising:
storing a plurality of sampling photos in a feature location library associated with a predetermined space by taking multiple sampling photos in multiple respective directions from each of a plurality of coordinate locations within the predetermined space;
obtaining a positioning photo taken by a mobile device within the predetermined space;
determining, with a processing device and based at least in part on the sampling photos of the feature location library, multiple matching feature elements of the positioning photo such that each matching feature element occurs both in the positioning photo and in one or more sampling photos of the feature location library;
for each determined matching feature element, obtaining a first position coordinate in the one or more sampling photos that include the feature element and a second position coordinate in the positioning photo; and
calculating one or more position parameters of the mobile device by using each of the obtained first position coordinate and second position coordinate, wherein the least number of feature elements existing in the positioning photo is determined according to a quantity of the one or more position parameters; wherein
determining the multiple feature elements further comprises using a view cone model;
the view cone model is configured to: build a view cone for each image, project the view cones into view triangles, detect overlapped content between the positioning photo and the one or more sampling photos, and removing feature elements from the matching feature elements that do not have overlapped content with the positioning photo; and wherein:
the one or more position parameters comprise at least part of global coordinates x, y, z of the mobile device, direction coordinates Dx, Dy, Dz of the mobile device, and axial rotation angle $\theta$ in the photo-taking direction of the mobile device.

2. The method of claim 1, further comprising marking the location of the mobile device in a pre-built map of the predetermined space according to the calculated position parameters.

3. The method of claim 1, wherein the positioning photo and at least one of the sampling photos that include at least one of the determined feature elements contain the same scene within the predetermined space.

4. The method of claim 1, wherein calculating the one or more position parameters of the mobile device includes building an equation set by using each of the obtained first position coordinates and second position coordinates, and solving the equation set to obtain the calculated position parameters.

5. The method of claim 4, wherein building the equation set further comprises, for each determined feature element, building an equation for the feature element that is based at least in part on intrinsic parameters and extrinsic parameters of the mobile device; wherein
the intrinsic parameters and extrinsic parameters include one or more of the following: focal distance, resolution, length-to-width ratio, and image format.

6. The method of claim 1, wherein the positioning photo is one of a static photo and a video frame extracted from a dynamic video.

7. The method of claim 1, wherein the feature element is one of a point and a straight line.

8. A data pre-processing method, comprising:
selecting sampling spots within a predetermined space;
taking sampling photos with a photo-taking device in multiple directions at the selected sampling spots; and
associating device parameters of the photo-taking device, position data of the sampling spots, data of the photo-taking direction and data of the predetermined space with the sampling photos, and storing them in a mobile device or a server to be used for calculating position parameters of the mobile device in the photo-based positioning method of claim 1, the device parameters including but not limited to focal distance, resolution, length-to-width rate, and image format.

9. A photo-based positioning apparatus, comprising:
a feature location library configured to store a plurality of sampling photos that includes multiple sampling photos taken from multiple respective directions from each of a plurality of coordinate locations within a predetermined space;
a photo obtaining unit configured to obtain a positioning photo taken by a mobile device within the predetermined space;
a feature matching unit configured to compare multiple feature elements exacted from one or more of the plurality of sampling photos with the positioning photo to determine matching feature elements that comprise each feature element existing in the positioning photo;
a coordinate obtaining unit configured to obtain, for each feature element determined to exist in the positioning photo, a first position coordinate of the feature element in the one or more sampling photos and a second position coordinate of the feature element in the positioning photo; and
a position calculating unit configured to calculate one or more position parameters of the mobile device by using each of the obtained first position coordinates and second position coordinates, wherein a least number of feature elements existing in the positioning photo is determined according to a number of the position parameters; wherein
the feature matching unit is further configured use a view cone model;
the view cone model is configured to: build a view cone for each image, project the view cones into view triangles, detect overlapped content between the positioning photo and the one or more sampling photos, and removing feature elements from the matching feature elements that do not have overlapped content with the positioning photo; and wherein
the one or more position parameters comprise at least part of global coordinates x, y, z of the mobile device, direction coordinates Dx, Dy, Dz of the mobile device, and axial rotation angle θ in the photo-taking direction of the mobile device.

10. The apparatus of claim 9, further comprising:
a visualization unit configured to display a pre-built map of the predetermined space on a display screen, and mark the location of the mobile device on the map according to the one or more position parameters.

11. The apparatus of claim 9, wherein the positioning photo and at least one of the one or more sampling photos contain the same scene within the predetermined space.

12. The apparatus of claim 9, wherein the position calculating unit is further configured to build an equation set by using each of the obtained first position coordinates and second position coordinates, and solve the equation set to obtain the one or more position parameters of the mobile device.

13. The apparatus of claim 12, wherein the position calculating unit is further configured to build an equation for each determined feature element using intrinsic parameters and extrinsic parameters of the mobile device so as to construct the equation set.

14. The apparatus of claim 9, wherein the positioning photo is one of a static photo and a video frame extracted from a dynamic video.

* * * * *